Jan. 26, 1971 E. S. BLAKE ET AL 3,558,748
FLUORINE-CONTAINING PHOSPHORAMIDATES
Filed Nov. 23, 1964

INVENTORS:
EDWARD S. BLAKE
RALPH E. De BRUNNER
DAVID R. DALTON
BY
Mary B. Mosher
ATTORNEY

United States Patent Office 3,558,748
Patented Jan. 26, 1971

3,558,748
FLUORINE-CONTAINING PHOSPHORAMIDATES
Edward S. Blake and Ralph E. De Brunner, Dayton, and David R. Dalton, Columbus, Ohio, assignors to Monsanto Research Corporation, St. Louis, Mo., a corporation of Delaware
Filed Nov. 23, 1964, Ser. No. 412,989
The portion of the term of the patent subsequent to Aug. 26, 1986, has been disclaimed
Int. Cl. C07f 9/24; C09k 3/00
U.S. Cl. 260—955                    12 Claims

ABSTRACT OF THE DISCLOSURE

Trifluoromethylphenyl dialkylphosphoramidates of the formulas

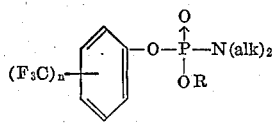

and

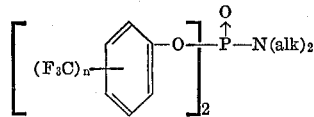

Figure 1:
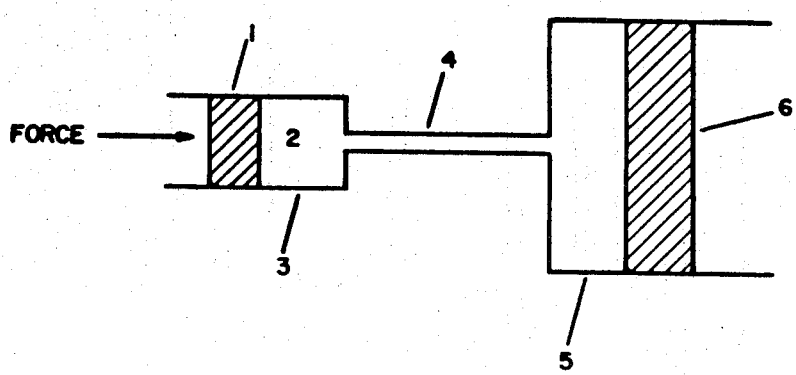

wherein $n$ is 1 or 2, and R is the fluorine-substituted radical $$-(CH_2)_x(CF_2)_yCF_2Z$$

$x$ being 1–4, $y$ being 0–5 and Z being either fluorine or hydrogen; useful as functional fluids having fire-retardant properties.

---

This invention relates to organic phosphorus compounds and more particularly provides a new and valuable class of phosphoramidates, the method of preparing the same, functional fluids comprising the new amidates and hydraulic pressure devices and methods of actuating such devices in which said fluids are used.

According to the invention, the presently provided phosphoramidates may be prepared by several different methods. One method involves condensation of an appropriate phosphorohalidate with an appropriate dialkylamine, substantially as follows:

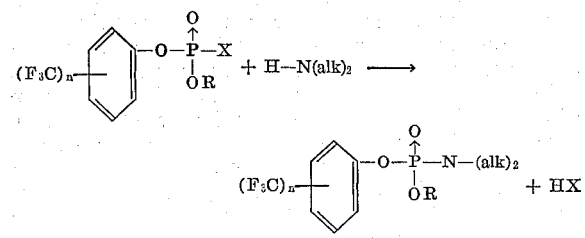

wherein $n$ is 1 or 2, X is halogen having an atomic weight above 34, R is a fluorine-substituted radical selected from the class consisting of the radical $$-(CH_2)_x(CF_2)_yCF_2Z$$

where $x$ is 1 to 4, $y$ is 0 to 5 and Z is selected from the class consisting of fluorine and hydrogen; and the radical

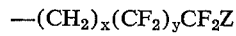

where $n$ is as above defined, and alk denotes an alkyl radical of from 1 to 5 carbon atoms. Another method especially suited to the preparation of the bis(trifluoromethyl-substituted phenyl) phosphoramidates, comprises reaction of (trifluoromethyl)-substituted phenol with a dialkylphosphoramidic dihalide, substantially according to the scheme:

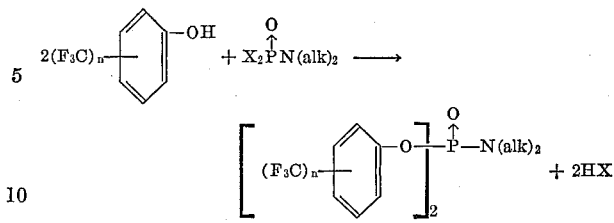

where $n$, X and alk are as defined above.

The second method is particularly useful when both of the ester groups are the same, e.g., when both are the (trifluoromethyl)-substituted phenyl radicals, since all that is required is the use of at least 2 moles of the appropriate phenol with one mole of the dihalide. However, the same method may also be employed for the preparation of mixed esters, since the dihalide may first be reacted with only enough of a hydroxy compound to replace one of the halogens and the resulting mono-esterified mono-halide then reacted with another hydroxy compound to give the mixed diester.

Compounds provided by the invention are the simple esters of the formula

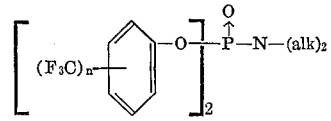

and the mixed esters of the formula

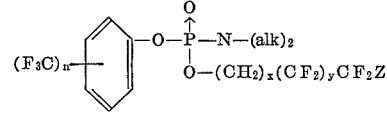

where alk, $n$, $x$, $y$ and Z are above defined.

Examples of the presently provided simple esters include the bis(o-, m- or p-trifluoromethylphenyl) dialkylphosphoramidates wherein each alkyl radical has from 1 to 5 carbon atoms and wherein the said alkyl radicals are the same or different in a single compound, e.g., bis-(o-trifluoromethylphenyl) dimethylphosphoramidate, bis-(p-trifluoromethylphenyl) dipentylphosphoramidate, bis-(m-trifluoromethylphenyl)diisopropylphosphoramidate, or bis(m-trifluoromethylphenyl) N - ethyl-N-butylphosphoramidate. The simple esters may also be derived from phenols having two trifluoromethyl radicals as nuclear substituents, e.g., bis[2,5-bis(trifluoromethyl)phenyl] dimethylphosphoramidate or diisobutylphosphoramidate; bis[2,3-bis(trifluoromethyl)phenyl] diethylphosphoramidate or N-butyl-N-pentylphosphoramidate; bis[3,4-bis-(trifluoromethyl)phenyl] dipropylphosphoramidate or dimethylphosphoramidate, etc.

Examples of the presently provided mixed esters are compounds in which one ester group is derived from a trifluoromethyl-substituted phenol and the other ester group is derived from a different trifluoromethyl-substituted phenol or from a fluorine-substituted alkanol of the formula $ZCF_2(CF_2)_y(CH_2)_xOH$ wherein Z, y and x are as defined above; e.g., o-trifluoromethylphenyl p-trifluoromethylphenyl dimethylphosphoramidate; 3,5-bis-(trifluoromethyl)phenyl p-trifluoromethylphenyl diethylphosphoramidate; m-trifluoromethylphenyl o-trifluoromethylphenyl N-butyl-N-methyl-phosphoramidate; 2,2,2-trifluoroethyl m-trifluoromethylphenyl diethylphosphoramidate; 2,2,3,3-tetrafluoropropyl o-trifluoromethylphenyl dipentylphosphoramidate; 5,5,5 - trifluoropentyl m-trifluoromethylphenyl dimethylphosphoramidate; 3,5-bis-(trifluoromethyl)phenyl 2,2,3,3,4,4-hexafluorobutyl diisopropylphosphoramidate; 4,5-bis(trifluoromethyl)phenyl 6,6,6-trifluorohexyl dimethylphosphoramidate; 4,4,5,5,6,6, 7,7,8,8,9,9-dodecafluoroheptyl m-trifluoromethylphenyl N-ethyl-N-methylphosphoramidate; 5,5,6,6,7,7,8,8,9,9,10,10,10-tridecafluorodecyl 2,3--bis(trifluoromethyl)phenyl dipentylphosphoramidate, 3,3,3-trifluoromethyl)phenyl m-trifluoromethylphenyl diethylphosphoramidate, etc.

When the presently provided compounds are prepared by reaction of a dialkylamine with a phosphorohalidate, the amine may be a simple amine, e.g., dimethyl-, dipropyl, diisopropyl-, dibutyl-, or dipentylamine or a mixed dialkylamine such as N-methylethylamine, N-ethylpentylamine or N-methylbutylamine. The phosphorohalidate may be a simple diester, e.g., the bis(o-, m- or p-trifluoromethylphenyl) or bis[2,3-, 2,4-, 2,5-, 3,4-, or 3,5-bis(trifluoromethyl)phenyl] phosphorochloridate, phosphorobromidate or phosphoriodidate. It may also be a mixed diester wherein one of the ester groups is one (trifluoromethyl)phenyl and the other is a different (trifluoromethyl)phenyl or the radical —$(CH_2)_x(CF_2)_yCF_2Z$, e.g., o-, m- or p-trifluoromethylphenyl 2,3- or 3,5-bis(trifluoromethyl)phenyl phosphorochloridate or phosphorobromidate, m-trifluoromethylphenyl p-trifluoromethylphenyl phosphorochloridate or phosphoriodidate; 4,4,5,5,6,6,6-heptafluorohexyl o-, m- or p-trifluoromethylphenyl phosphorochloridate or phosphorobromidate, 2,2,3,3,4,4-hexafluorobutyl o-, m- or p-trifluoromethylphenyl phosphorobromidate or phosphorochloridate, 2,5- or 3,4-bis(trifluoromethyl)phenyl 4,4,5,5,6,6,7,7,8,8,8, - undecafluorooctyl phosphorochloridate or phosphorobromidate, etc. The phosphorohalidates are obtained in known manner, e.g., by reacting a phosphoryl halide with 2 molar equivalents of the appropriate phenol, or with one molar equivalent each of two different phenols, or one molar equivalent each of a phenol and an appropriate alkanol.

When the presently provided compounds are prepared by the reaction of a phosphoramidic dihalide with an appropriate fluorine-substituted hydroxy compound, the dihalide component may be any dialkylphosphoramidic dichloride, dibromide, diiodide, chlorobromide, bromoiodide, or chloroiodide in which each alkyl radical has from 1 to 5 carbon atoms, e.g., dimethyl-, diethyl-, dipropyl-, dibutyl-, dipentyl-, N-ethyl-N-methyl or N-butyl-N-propylphosphoramidic dichloride or dibromide. The aromatic hydroxy compound may be, e.g., o-, m-, or p-trifluoromethylphenol, a bis(trifluoromethyl)phenol, such as 2,3-, 3,5- or 2,5-bis(trifluoromethyl)phenol. Two moles of the same trifluoromethyl-substituted phenol per mole of the dialkylphosphoramidic dihalide react to give the simple diester, or one mole each of two different trifluoromethyl-substituted phenol, or one mole each of one of said trifluoromethyl-substituted phenols and an alkanol of the formula

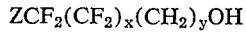
$$ZCF_2(CF_2)_x(CH_2)_yOH$$

e.g., 2,2,2-trifluoroethanol, and a trifluoromethylphenol react to give a mixed ester. For example, the reaction of a dialkylphosphoramidic dihalide such as dibutylphosphoramidic dichloride or dibromide with 2 moles of o-, m- or p-trifluoromethylphenol yields bis(o-, m- or p-trifluoromethylphenyl dibutylphosphoramidate, whereas the reaction of one mole of o-, m- or p-trifluoromethylphenol and one mole of a fluorine-substituted alkanol such as 2,2,3,3,4,4,5,5,5-nonafluoropentanol with the same dichloride or dibromide gives 2,2,3,3,4,4,5,5,5-nonafluoropentyl o-, m- or p-trifluoromethylphenyl dibutylphosphoramidate.

Generally, when the mixed diesters of phosphoramidic acid are desired, it is advantageous to use the phosphorohalidate/amine reaction rather than the phosphoramidic dihalide/hydroxy compound reaction. This is because mono-esterification of the phosphoramidic dihalide with one hydroxy compound and subsequent reaction of the mono-ester phosphoramidic mono-halide with another hydroxy compound presents problems of control which are not so generally encountered in the phosphorohalidate/amine reaction.

In the phosphorohalidate/amine reaction, the appropriate diorgano phosphorohalidate, whether simple or mixed, i.e., a simple diester such as bis(m-trifluoromethyl)phenyl phosphorobromidate or a mixed diester such as 3,5-bis(trifluoromethyl)phenyl m-trifluoromethylphenyl phosphorochloridate or o-trifluoromethylphenyl 2,2,2-trifluoroethyl phosphorochloridate is contacted with the dialkylamine at ambient temperature or with heating. In some instances, reaction rate is accelerated by heating and, particularly when working with the higher molecular weight halidates, temperatures of from, say 50° C. to below the decomposition temperature of either the reactants or the amidate product are employed. With the lower halidates and the lower dialkylamines, the reaction may be slightly exothermic; so that, for smooth reaction, external cooling may be desirable. Generally, depending upon the nature of the individual reactants, temperatures of from, say, 0° C. to 150° C., and preferably of from, about 5° C. to 125° C. are useful.

The reaction may or may not be conducted in the presence of an inert, organic liquid diluent or solvent, e.g., a halogenated alkane such as chloroform, carbon tetrachloride or ethylene chloride, an ether such as ethyl ether, dioxane, diethylene glycol dimethyl ether, or an amide such as dimethylformamide or dimethylacetamide.

A catalyst may or may not be used. Operation in the presence of a basic agent is recommended, since the latter serves as scavenger for the by-product hydrogen halide. An excess of the dialkylamine reactant over the 1:1 molar ratio which is stoichiometrically required may conveniently serve as scavenger. However, the basic scavenger may be an extraneous agent such as triethylamine or tributylamine; a heterocyclic nitrogen base such as N-methylmorpholine or pyridine; an alkali or alkaline earth metal oxide or the basic salt thereof such as sodium, potassium, lithium, calcium or magnesium oxide, carbonate or acetate, etc.

All of the reaction conditions, i.e., whether or not a diluent and/or a basic agent is employed and the nature of the diluent or of said agent if it is used, temperature, pressure, reaction time, reactant proportions, etc., can be readily determined by easy experimentation. Thus, arrival at optimum reaction conditions is simply a matter of routine procedure by one skilled in the art. Reaction is generally rapid and is usually evidenced by evolution of hydrogen halide if no scavenger is used. When an organic amine is employed as scavenger, reaction is frequently evidenced by copious precipitation of the amine hydrohalide. To assure complete reaction in experimental runs, it is generally recommended that after initial reaction has appeared to subside, the reaction mixture be allowed to stand at room temperature for a time before working up the product or that the temperature of the reaction mixture be increased after sufficient time has elapsed for any exothermic reaction to have occurred.

As has already been pointed out, formation of the presently provided fluorine-containing phosphoramidates from the halidate and the dialkylamine takes place by condensation of one mole of the fluorine-containing phosphorohalidate with one mole of the dialkylamine. Hence the reactants are advantageously employed in such stoichiometric proportions. However, an excess of the amine may be employed, and such excess is recommended when it is desired to assure complete reaction of a comparatively more difficulty available phosphorohalidate reactant, or when it is also desired to employ the amine as a hydrogen halide scavenger. When a scavenger (either an excess of the amine reactant or an extraneous base) is used, the fluorine-containing phosphoramidate is conveniently isolated from the reaction mixture by first removing the hydrohalide by-product, e.g., by neutralizing and/or water-washing, and then fractionally distilling the residual organic phase in order to remove any unused reactant, organic base, diluent, etc., that may be present.

When operating in the absence of a scavenger, it is advantageous, in order to obtain optimum yields, to provide for mechanical removal of the by-product hydrogen halide, e.g., by vigorous agitation of the reaction mixture, dephlegmation, etc.

When the presently provided fluorine-containing phosphoramidates are prepared by the phosphoramidic dihalide/hydroxy compound reaction, e.g., by reaction of a dihalide such as dimethylphosphoramidic dichloride or dibromide with a phenol such as o-, m- or p-trifluoromethylphenol, the reaction takes place similarly, insofar as temperature conditions, use of scavenger, and separation of product are concerned; but, as has already been pointed out, for optimum yield the reactants should be present in the 1:2 dihalide/hydroxy compound stoichiometric proportion.

The presently provided fluorine-substituted phosphoramidates are stable, well characterized, normally liquid materials. They are of particular interest for use as functional fluids, since they are generally fluid over wide temperature ranges, possess high flash points nad high ignition points, are extremely resistant to attack by moisture, and possess good thermal stability. Hence, they are eminently suited for use as hydraulic fluids, especially in hydraulic systems which are subjected to widely varying temperature conditions and exposure to water. The present compounds possess good viscosity/temperature relationships and are also useful, e.g., as heat-exchange media, gyro fluids, and lubricants.

Evaluation of the hydraulic fluid efficacy of the present phosphoramidates was conducted by determining such characteristics as pour point, kinematic viscosity, ASTM slope, autogenous ignition temperature and behavior upon sudden exposure to very high temperatures. The following procedures were used to obtain the data given in the working examples which follow:

The pour point was determined by American Society for Testing Materials (hereinafter referred to as ASTM) procedure D97–57, except that a small pour point tube, Model J–2436 supplied by Scientific Glass Apparatus Company was substituted for the larger tube prescribed in the ASTM procedure. This was done to conserve test material.

Kinematic viscosity was determined by ASTM D445–T 1960 procedure, using Cannon-Manning Semi-Micro viscometers, calibrated and supplied by the Scientific Development Corporation, State College, Pa.

ASTM slope was determined from the curve plotted from viscosity data on ASTM viscosity-temperature chart (D341–39).

The flash points and fire points were determined by ASTM D92–57 procedure, modified by testing 1 ml. samples.

The autogenous ignition temperature was determined by ASTM D2155–60T procedure.

Flammability at 1300° F. was determined by visual observation of the behavior of the test material when introduced dropwise at the surface of molten aluminum which is maintained at 1300° F. If no burning resulted, a single spark was applied for a more stringent test of fire resistance.

Vapor pressure and thermal stability measurements were conducted by employing substantially the method described by E. S. Blake et al., J. Chem. Eng. Data, 6, 87 (1961), using the isoteniscope, constant temperature bath and vacuum handling system.

Figure 2:
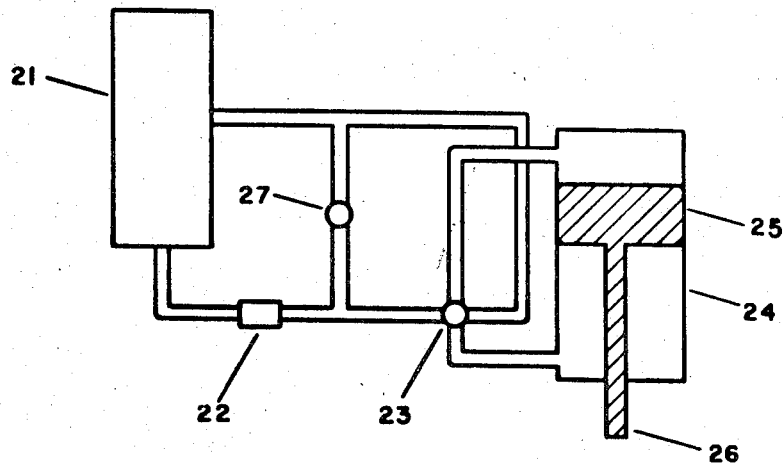

The present phosphoramidates are eminently useful as the operative fluids of hydraulic systems. Such systems comprise a displaceable member and a displacing force which is transmitted to said member by means of said fluid, as shown in the schematic diagram of FIG. 1 of the drawings. Here, a displacing force is applied to piston 1 and transmitted through the fluid 2 contained in cylinder 3 whence it travels through line 4 into cylinder 5 where it acts on the displaceable member 6. In such a system, actuation of a moveable member by the presently provided fluid gives performance characteristics which are outstanding because of the physical properties of the fluid. While hydraulic systems will contain such elements as pumps, valves, cylinders and pistons, the efficacy of the system necessarily depends upon the fluid, since the fluid must be one which can withstand pressure and remain fluid under the conditions of use. FIG. 2 of the drawings is a schematic diagram which well illustrates the indispensable role of the fluid in cooperation with other components of a hydraulic system. Here the fluid is stored in reservoir 21, and is pumped therefrom by means of pump 22 and through the directional control valve 23 into either end of cylinder 24, where it acts on piston 25 connected by shaft 26 to a motor (not shown) or other device which converts the hydraulic pressure applied to piston 25 into mechanical energy. Action of the fluid on piston 25 displaces the piston until it reaches the end of its travel. The piston may be caused to travel in either direction by adjustment of the directional valve 23. Valve 23 provides for return of the fluid from the opposite side of the piston, back to reservoir 21. Relief valve 27 is provided to maintain a constant hydraulic pressure within the system. When a predetermined pressure is reached, the fluid will flow back to reservoir 21 by functioning of said relief valve.

Owing to their very good fire-retardant properties, the present phosphoramidates are particularly useful in hydraulic pressure devices that are employed under conditions wherein any leak or break in the hydraulic system could provide great danger of fire. The low pour points of the present compounds permit fabrication of pressure devices which are destined for use in cold climates, and their very good vapor pressure characteristics and stability to heat allows use of the same devices in hot environments. The viscosity characteristics and ASTM slopes of the fluids make them of great utility for the transmission of power in a hydraulic system having a pump therein which supplies power for the system, e.g., in a fluid motor comprising a constant- or variable-discharge piston pump which is caused to rotate by the pressure of the hydraulic fluid of the system. The pressure fluid likewise serves to lubricate the frictional, moving parts of such hydraulic systems.

For use in a conventional automatic transmission, the presently provided hydraulic fluid is contained in the outer casing of the transmission device, which casing is attached to the usual engine crankshaft and flywheel and rotates therewith. Within the fluid is a coupling comprising an impeller connected to said casing and a turbine which is connected to the drive shaft of the vehicle. The turbine is driven by the motion of the fluid in response to the rotation of the impeller, as the casing to which the impeller is attached is actuated by the crankshaft and flywheel.

The presently described phosphoramidates are particularly suited for use as the operative fluids in hydraulic braking devices owing to their very good vapor pressure characteristics. Under current, severe operating conditions heat build-up within the brake system is frequently encountered. Unless the fluid remains liquid at the high temperatures thus developed, the hydraulic brake system becomes inoperable since the vaporized fluid becomes compressible. Although much effort has been expended at providing high boiling hydraulic brake fluids, generally, materials which are high boiling congeal at low temperatures. The presently provided fluids have boiling points which are well over 400° F. and some of them do not boil until over 600° F. Hence, hydraulic brake systems in which these fluids are used withstand the dangers ensuing from heat build-up. At the same time, owing to the low pour points of the fluids, the system is one which is operable in very cold environment. The present invention thus provides an improved method for applying pressure to a hydraulic brake through a fluid.

The presently provided compounds and mixtures are useful as the hydraulic fluids of hydraulic machines, generally, e.g., lifts, hoists, jacks, lockgates, presses, etc.

The invention is further illustrated by, but not limited to, the following examples.

EXAMPLE 1

To a solution of 78.5 g. (1.74 moles) of dimethylamine in 200 cc. of chloroform there was added during 30 minutes a solution of 57.1 g. (0.133 mole) of bis(m-trifluoromethylphenyl) phosphorochloridate in 100 cc. of chloroform while maintaining the temperature of the reaction mixture at −5° to −10° C. The whole was held at between −5° C. to 0° C. for 30 minutes and then allowed to stand for several days at room temperature. Most of the chloroform was evaporated off, and the residue was poured into ice/hydrochloric acid mixture. When the ice had melted, the mixture was extracted with chloroform and the extract was washed successively with dilute aqueous potassium hydroxide, 6 N hydrochloric acid, and water, and then filtered. Removal of the chloroform from the filtrate and distillation of the residue gave 38.8 g. (73.2% theoretical yield) of the colorless, fluid bis(m-trifluoromethylphenyl) dimethylphosphoramidate, B.P. 151–2° C./2.9 mm., $n_D^{25}$ 1.4651.

The compound was found to have a pour point of minus 30° F. and the following kinematic viscosities at the temperatures shown below.

| Temp., ° F.: | Centistokes |
| --- | --- |
| 25 | 245.8 |
| 100 | 11.21 |
| 210 | 2.25 |

The ASTM slope for the 100°–210° F. range was 0.92.

The autogenous ignition temperature was 1015° F. for 0.07 ml., with a lag of 6 seconds. In the molten metal test the compound did not ignite without application of a spark, and then it only flashed and did not burn. The flash point was 428° F., and it did not fire at the maximum test temperature of 648° F.

The bis(m-trifluoromethylphenyl) phosphorochloridate which was used as a starting material in this example was prepared as follows: A mixture consisting of 81 g. (0.5 mole) of m-trifluoromethylphenol and 38.5 g. (0.25 mole) of phosphoryl chloride was heated under nitrogen to 260° C., held at this temperature for 32 hours, allowed to cool to room temperature under nitrogen and then distilled to give 51.7 g. of the substantially pure bis(m-trifluoromethylphenyl) phosphorochloridate, B.P. 186–191° C./15 mm., $n_D^{25}$ 1.4690.

EXAMPLE 2

A dilute ether solution of 202 g. (0.5 mole) of bis(m-trifluoromethylphenyl) phosphorochloridate, prepared as in Example 1, was added to a solution of 200 g. (1.55 moles) of dibutylamine in 300 g. of ether while maintaining the temperature at 10–20° C. by means of Dry Ice cooling. The whole was stirred for one hour and then allowed to stand overnight at room temperature. By-product amine hydrochloride was filtered off, and the filtrate was washed first to acidity with dilute hydrochloric acid and then with water until neutral. After drying the organic phase with a sodium sulfate and then with magnesium sulfate, it was distilled to give 212.9 g. (85.5% theoretical yield) of the substantially pure bis(m-trifluoromethylphenyl) dibutylphosphoramidate, B.P. 154–160° C./0.12–0.2 mm., and analyzing as follows.

Calc'd for $C_{22}H_{26}F_6NO_3P$ (percent): C, 53.11; H, 5.27; N, 2.82. Found (percent): C, 53.52; H, 5.18; N, 2.74.

Evaluation of a fraction, B.P. 156° C./0.15 mm., of the bis(m - trifluoromethylphenyl) dibutylphosphoramidate gave a pour point of minus 40° F. It had kinematic viscosities of 19.97 centistokes at 100° F. and 3.02 at 210° F. The ASTM slope for the 100°–210° F. range was 0.95. The flash point was 405° F. and the fire point, 605° F. Temperatures for vapor pressure equal to certain pressure of mercury were determined to be as follows.

| Temp., ° C.: | Pressure, mm. Hg |
| --- | --- |
| 161 | 10 |
| 246 | 100 |
| 340 | 600 |
| 354 | 760 |

EXAMPLE 3

A dilute, ether solution of 40.5 g. (0.1 mole) of bis(m-trifluoromethylphenyl) phosphorochloridate, prepared as in Example 1, was slowly added with ice-cooling, to a dilute ether solution of 20 g. (0.28 mole) of diethylamine. After stirring well, the whole was allowed to stand overnight at room temperature. It was then washed, first with water, then with dilute hydrochloric acid and finally several times with water. The resulting organic phase was then dried over magnesium sulfate and distilled to give the substantially pure bis(m-trifluoromethylphenyl) diethylphosphoramidate, B.P. 125–130° C./0.05 mm., $n_D^{25}$ 1.4652, and analyzing as follows.

Calc'd for $C_{18}H_{18}F_6NO_3P$ (percent): C, 48.99; H, 4.11; N, 25.83. Found (percent): C, 49.12; H, 4.20; N, 25.69.

The compound was found to have a pour point of minus 30° F., and the following kinematic viscosities were determined at the temperatures shown below.

| Temp., ° F.: | Centistokes |
| --- | --- |
| 25 | 362.4 |
| 100 | 15.42 |
| 210 | 2.55 |

The ASTM slope was 0.98 for the 100–210° F. range.

The autogenous ignition temperature was 1030° F. for 0.1 ml., with a lag of 5 seconds. In the molten metal test, the compound did not ignite without application of a spark. The flash point was found to be 455° F. and it did not fire at the maximum test temperature of 670° F.

EXAMPLE 4

To an ether solution of 359 g. (0.89 mole) of bis(m-trifluoromethylphenyl) phosphorochloridate (total volume of solution, 500 ml.), there was added over a 30 minute period a solution of 153 g. (3 moles) of dimethylamine in 500 g. of ether at a temperature of −10° to 0° C. The whole was then stirred while warming to room temperature (20° C.) during about a 3-hour period. The by-product amine hydrochloride was filtered off, and the filtrate was washed first with water, then to acidity with ice-cold, dilute hydrochloric acid, finally with 5% aqueous sodium hydroxide. Upon addition of about 75 ml. of a saturated salt solution, stratification occurred. The organic phase was dried over magnesium sulfate and anhydrous potassium carbonate and filtered. Ether was removed from the filtrate by evaporating under vacuum, and the residue was distilled to give 311.8 g. (90% theoretical yield) of the substantially pure bis(m-trifluoromethylphenyl) dimethylphosphoramidate, B.P. 160–164° C./2.3–2.5 mm., which analyzed follows.

Calc'd for $C_{16}H_{16}F_6NO_3P$ (percent): C, 46.50; H, 3.41; F, 27.58. Found (percent): C, 46.53; H, 3.43; F, 27.80.

The bis(m-trifluoromethylphenyl) phosphorochloridate of this example was prepared by heating a mixture consisting of 485 g. (3.0 moles) of m-trifluoromethylphenol and 248 g. (1.61 moles) of phosphoryl chloride for 8 hours at 120–260° C. and for 16 hours at 260° C. and distilling the resulting reaction product to give 359 g. of the substantially pure bis(m-trifluoromethylphenyl) phosphorochloridate, B.P. 180–200° C./13 mm.

EXAMPLE 5

To a mixture consisting of 34.5 g. (0.15 mole) of 3,5-bis(trifluoromethyl)phenol and 15.5 g. (0.153 mole) of triethylamine there was added, dropwise, 14.2 g. (0.075 mole) of diethylphosphoramidic dichloride, while maintaining the temperature of the reaction mixture at below 10° C. The whole was then stirred for 15 hours at 15–20° C. It was then washed in a separatory funnel, twice with water and finally with 1 N hydrochloric acid until acidic. The organic layer was separated and washed, first with 5% aqueous sodium carbonate until alkaline and then with salt water to neutrality. It was then distilled to give the substantially pure, bis[3,5-bis(trifluoromethyl)phenol] diethylphosphoramidate, B.P. 108°–110° C./0.03–0.02 mm., $n_D^{25}$ 1.4286, and analyzing as follows.

Calc'd for $C_{20}H_{16}F_{12}NO_3P$ (percent): C, 41.61; H, 2.79; F, 39.49. Found (percent): C, 41.53; H, 2.73; F, 39.32.

A fraction, B.P. 108°–109° C./0.03–0.02 mm. of the bis[3,5 - bis(trifluoromethyl)phenyl]diethylphosphoramidate was tested for functional fluid utility. It was found to have a kinematic viscosity of 29.53 centistokes at 100° F. and 3.07 centistokes at 210° F. The autogenous ignition temperature was 1045° F. for 0.07 ml. with 7 seconds lag. It had a flash point of 415° F. and did not fire at the maximum test temperature of 551° F.

EXAMPLE 6

Operating substantially as in Example 5, but using dimethylphosphoramidic dichloride instead of the diethylphosphoramidic dichloride of Example 5, there was obtained bis[3,5-bis(trifluoromethyl)phenyl] dimethylphosphoramidate, a colorless liquid B.P. 126° C./0.3 mm., $n_D^{25}$ 1.4260, and analyzing as follows.

Calc'd for $C_{18}H_{12}F_{12}NO_3P$ (percent): C, 39.36; H, 2.20. Found (percent): C, 39.48; H, 2.03.

EXAMPLE 7 m-Trifluoromethylphenyl phosphorodichloridate was prepared by refluxing (pot temperature, 235° C.) for 24 hours a mixture consisting of 533 g. (3.5 moles) of phosphoryl chloride and 1000 g. (6.2 moles) of m-trifluoromethylphenol and distilling the resulting reaction mixture to give 230 g. of the substantially pure m-trifluoromethylphenyl phosphorodichloridate, B.P. 125–7° C./21 mm., $n_D^{25}$ 1.4668

To the 230 g. (0.87 mole) of the above phosphorodichloridate there was added portionwise 146.6 g. (0.44 mole) of 2,2,3,3,4,4,5,5,6,6,7,7 - dodecafluoroheptanol at 100–130° C. and the whole was then heated, with stirring, at 130° C. for about 4 hours. Distillation of the resulting reaction mixture gave the substantially pure 2,2,3,3,4,4, 5,5,6,6,7,7, - dodecafluoroheptyl m-trifluoromethylphenyl phosphorochloridate, B.P. 157° C./5 mm.

To 22.5 g. (0.5 mole) dimethylamine there was added at 0–10° C. over approximately a 1-hour period, a solution of 115 g. (0.2 mole) of the above-prepared 2,2,3,3, 4,4,5,5,6,6,7,7 - dodecafluoroheptyl m-trifluoromethylphenyl phosphorochloridate. The whole was stirred for 6 hours while allowing to warm to room temperature and then allowed to stand overnight. At the end of that time, ice and dilute hydrochloric acid were added to the reaction mixture until the aqueous phase was acid. The organic phase which formed was separated and washed successively with water, dilute aqueous sodium hydroxide, dilute hydrochloric acid, and water to neutrality. After drying the washed organic material over magnesium sulfate, it was stripped of ether and distilled to give the substantially pure 2,2,3,3,4,4,5,5,6,6,7,7 - dodecafluoroheptyl m-trifluoromethyl dimethylphosphoramidate, B.P. 137° C./0.05 mm., $n_D^{25}$ 1.3892–1.3894.

A 75 g. sample of this phosphoramidate was shaken with 25 ml. of water at 92° C. for 2 hours. The organic portion was separated, taken up in ether and washed with dilute hydrochloric acid, dilute sodium hydroxide, and water. After drying the ether was stripped and the residue distilled, filtered through attapulgus clay and redistilled to give pure 2,2,3,3,4,4,5,5,6,6,7,7 - dodecafluoroheptyl m-trifluoromethylphenyl dimethylphosphoramidate, B.P. 127° C./0.04 mm., $n_D^{25}$ 1.3892, which analyzed as follows.

Calc'd for $C_{16}H_{13}F_{15}NO_3P$ (percent): C, 32.95; H, 2.25; F, 48.86. Found (percent): C, 32.68; H, 2.41; F, 49.04.

Subsequently the compound was evaluated for functional fluid efficacy.

The pour point was found to be minus 30° F. and the following kinematic viscosities were determined at the temperatures shown below.

| Temp., ° F.: | Centistokes |
| --- | --- |
| 25 | 480.1 |
| 100 | 23.03 |
| 210 | 3.13 |

The ASTM slope was 0.97 for the 100°–210° F. range.

The autogenous ignition temperature was 945° F. for 0.07 ml. with a lag of 5 seconds. The flash point was 486° F. and it did not fire at the maximum test temperature of 601° F.

The operative fluid of the present hydraulic systems and methods may be a mixture of one or more of the isomeric trifluoromethyl-substituted phenyl dialkylphosphoramidates. In some instances, it will be found that those of the compounds having meta- and/or ortho-substitution at the phenyl nucleus possess better fluidity than do the para-substituted compounds. Also, the N-dialkyl portions of the phosphoramidates may be varied. Thus there may be used mixed dialkylphosphoramidates, i.e., compounds in which the two alkyl radicals are dissimilar or mixtures of two or more different, simple or mixed dialkylphosphoramidates.

The presently provided phosphoramidates may also be mixed with known hydraulic fluids, e.g., the trialkyl phosphates or the dialkyl arylphosphonates or the aromatic polyethers, so long as the properties of the resulting mixture meet the specifications required of a hydraulic fluid for the intended use. Obviously, if the intended use places no limitation on such factors as either low- or high-temperature behavior, or if no fire-hazard exists, the present compounds may be included in any proportion. However, if one or more of these factors is important, then care should be observed in preventing an undesired extent of dilution. Generally, at least a major component of the mixture should be the phosphoramidate.

Also, the usual fluid additives, e.g., corrosion inhibitors, antioxidants, viscosity-index improvers, etc., may be added to the presently provided fluid phosphoramidates, although for most purposes it will be found that such additives can be dispensed with.

It is to be understood that although the invention has been described with specific reference to particular embodiments thereof, it is not to be so limited since changes and alterations therein may be made which are within the full intended scope of this invention as defined by the appended claims.

What we claim is:

1. The compound of the formula

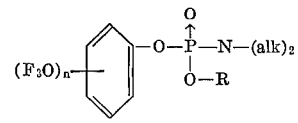

wherein $n$ is 1 or 2, R is a fluorine-substituted radical selected from the class consisting of the radical —$(CH_2)_x(CF_2)_yCF_2Z$ where $x$ is 1 to 4, $y$ is 0 to 5 and Z is selected from the class consisting of fluorine and hydrogen; and the radical

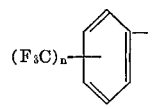

wherein $n$ is as above defined, and alk is an alkyl radical of from 1 to 5 carbon atoms.

2. The compound of the formula

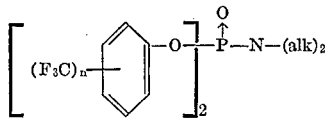

wherein $n$ is 1 to 2 and alk is an alkyl radical of from 1 to 5 carbon atoms.

3. The compound of the formula

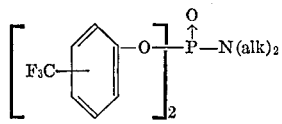

wherein alk is an alkyl radical of from 1 to 5 carbon atoms.

4. The compound of the formula

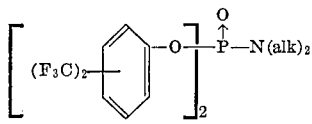

wherein alk is an alkyl radical of from 1 to 5 carbon atoms.

5. The compound of the formula

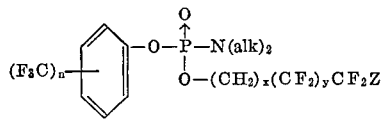

wherein $n$ is 1 or 2; $x$ is 1 to 4, $y$ is 0 to 5 and Z is selected from the class consisting of hydrogen and fluorine, and alk is an alkyl radical of from 1 to 5 carbon atoms.

6. The compound of the formula

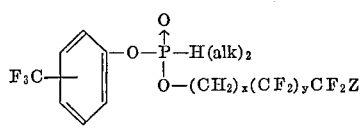

wherein alk is an alkyl radical of from 1 to 5 carbon atoms, $x$ is 1 to 4, $y$ is 0 to 5 and Z is selected from the class consisting of hydrogen and fluorine.

7. Bis(m - trifluoromethylphenyl)dibutylphosphoramidate.

8. Bis(m - trifluoromethylphenyl) diethylphosphoramidate.

9. Bis(m - trifluoromethylphenyl) dimethylphosphoramidate.

10. Bis[3,5 - bis(trifluoromethyl)phenyl]diethylphosphoramidate.

11. Bis[3,5 - bis(trifluoromethyl)phenyl]dimethylphosphoramidate.

12. 2,2,3,3,4,4,5,5,6,6,7,7 - dodecafluoroheptyl m - trifluoromethylphenyl dimethylphosphoramidate.

References Cited

UNITED STATES PATENTS 2,385,713  9/1945  Kosdapoff _____ 260—984X

CHARLES B. PARKER, Primary Examiner

A. H. SUTTO, Assistant Examiner

U.S. Cl. X.R.

252—49.9, 78; 260—984